United States Patent
Meng et al.

(10) Patent No.: US 9,945,285 B2
(45) Date of Patent: Apr. 17, 2018

(54) AIR PRESSURE BOOSTER FOR ENGINE

(71) Applicant: San-Chun Meng, Kaohsiung (TW)

(72) Inventors: San-Chun Meng, Kaohsiung (TW); Yi-Chen Chen, Taipei (TW); Pei-Hung Meng, Kaohsiung (TW); Jing-Hong Chen, Tainan (TW)

(73) Assignee: San-Chun Meng, Kaohsiung (TW)

( * ) Notice: Subject to any disclaimer, the term of this patent is extended or adjusted under 35 U.S.C. 154(b) by 29 days.

(21) Appl. No.: 15/201,758

(22) Filed: Jul. 5, 2016

(65) Prior Publication Data
US 2017/0198630 A1    Jul. 13, 2017

(30) Foreign Application Priority Data

Jan. 11, 2016   (TW) .............................. 105100639 A

(51) Int. Cl.
*F02M 35/10*   (2006.01)
*F02B 31/04*   (2006.01)

(52) U.S. Cl.
CPC ............. *F02B 31/04* (2013.01); *F02M 35/10* (2013.01); *F02M 35/10262* (2013.01); *Y02T 10/146* (2013.01)

(58) Field of Classification Search
CPC ............. F02M 35/10262; F02M 35/10; F02M 35/10006; F02M 35/10118; F02B 31/04
USPC ....................................................... 123/566
See application file for complete search history.

(56) References Cited

U.S. PATENT DOCUMENTS

| | | | | |
|---|---|---|---|---|
| 1,823,811 A * | 9/1931 | Watkins | .................... | F02M 1/00 123/546 |
| 1,828,816 A * | 10/1931 | Pierson | ................ | F02M 35/026 123/566 |
| 1,853,838 A * | 4/1932 | White | ........................ | F04F 5/42 123/566 |
| 1,922,469 A * | 8/1933 | Borthwick | ....... | F02M 35/10013 123/566 |
| 2,024,665 A * | 12/1935 | Snell | .................... | F02M 35/026 123/566 |
| 2,114,783 A * | 4/1938 | Kowitt | ............. | F02M 35/10013 123/566 |
| 2,184,918 A * | 12/1939 | Kowitt | .................... | F02B 33/00 123/566 |
| 2,267,706 A * | 12/1941 | Baile | ................ | F02M 35/10013 55/383 |
| 2,388,213 A * | 10/1945 | Mock | .................... | F02M 31/068 123/556 |
| 2,670,055 A * | 2/1954 | Dorman | ................ | F02M 35/04 123/566 |

(Continued)

*Primary Examiner* — Thomas Moulis
(74) *Attorney, Agent, or Firm* — Alan D. Kamrath; Kamrath IP Lawfirm, P.A.

(57) ABSTRACT

An air-pressure booster includes a tube, an indirect flow pass and a direct flow pass respectively formed inside the tube. A tapered neck is formed on one end of the tube and connects to an air output nozzle which is connected to an engine. When the engine is working, air passes through the indirect flow pass and the direct flow pass. The air rates respectively generated from the indirect flow pass and the direct flow pass are different and form a whirlpool inside the tapered neck, outputting an enhanced air force and pressure. Therefore, the air-pressure booster could increase efficiency of fuel use and could reduce oil consumption.

15 Claims, 23 Drawing Sheets

(56) References Cited

U.S. PATENT DOCUMENTS

| | | | | |
|---|---|---|---|---|
| 2,808,893 A * | 10/1957 | Dorman | F02B 33/00 | 123/566 |
| 3,757,751 A * | 9/1973 | Kitchin | B60K 13/02 | 123/566 |
| 3,948,234 A * | 4/1976 | Shumaker, Jr. | F02B 27/00 | 123/566 |
| 4,351,302 A * | 9/1982 | Brettler | F02M 25/12 | 123/566 |
| 4,373,940 A * | 2/1983 | Petersen | B01D 45/14 | 55/328 |
| 4,459,141 A * | 7/1984 | Burrington | B01D 45/16 | 55/317 |
| 4,695,225 A * | 9/1987 | Hellat | F15D 1/0015 | 239/486 |
| 7,171,986 B2 * | 2/2007 | Canova | F02M 35/10013 | 138/37 |
| 7,267,098 B1 * | 9/2007 | Tasanont | F02B 31/04 | 123/306 |
| 7,665,442 B1 * | 2/2010 | Levitz | F02M 29/06 | 123/184.21 |
| 8,322,381 B1 * | 12/2012 | Glanville | B01F 5/0616 | 138/37 |
| 9,051,900 B2 * | 6/2015 | Teng | F02B 31/04 | |
| 9,222,403 B2 * | 12/2015 | Hill | F02M 17/10 | |
| 9,228,542 B2 * | 1/2016 | Anderson | F02M 35/10262 | |
| 9,394,825 B2 * | 7/2016 | Dziubinschi | F02B 29/0468 | |
| 9,488,139 B2 * | 11/2016 | Rollins | F02M 25/0836 | |
| 9,587,566 B2 * | 3/2017 | Ito | F02M 35/10262 | |
| 9,689,334 B2 * | 6/2017 | Klassen | F02D 41/18 | |
| 2003/0072214 A1 * | 4/2003 | Fleischli | B01F 5/0473 | 366/175.2 |
| 2008/0060712 A1 * | 3/2008 | Gluzman | B01F 5/0617 | 138/39 |
| 2008/0210325 A1 * | 9/2008 | Aroussi | B01F 5/061 | 138/39 |
| 2009/0050105 A1 * | 2/2009 | Shibata | B01D 45/16 | 123/306 |
| 2012/0222764 A1 * | 9/2012 | Hermann | F02B 37/00 | 137/808 |
| 2013/0153074 A1 * | 6/2013 | Gurr | | 138/39 |
| 2013/0319380 A1 * | 12/2013 | Hommes | F02B 33/34 | 123/559.1 |

\* cited by examiner

AIR PRESSURE BOOSTER FOR ENGINE

BACKGROUND OF THE INVENTION

1. Field of Invention

The present invention is related to an air-pressure booster and, especially, to an air-pressure booster which could improve efficiency of air input and torque of an engine.

Description of the Related Art

Internal combustion engines, such as reciprocating engines, are used in cars, motorcycles boats or mowers for applying direct force to some component of the engine. The force is applied typically to pistons, turbine blades, or a nozzle. This force moves the component over a distance, transforming chemical energy into useful mechanical energy. The force is generated by four processes including air input, compression, explosion and air output in the engine where air and fuel were fully mixed. Therefore, the oil-gas ratio is an important parameter for the engines. A well oil-gas ratio may promote fuel usage, enhance the output of force and decrease the volume of gas exhaust.

However, the pass way of air injection comprises an air intake pipe, a throttle, an air intake manifold and ports. If the components are aging, the volumes of air intake into the engine reduce, and fuel could not be used efficiently. Therefore, oil consumption increase, and torque of an engine decrease.

To solve the above problems, a turbo charger is used. However, the gear-set and exhaust turbine of the turbocharger are very heavy, leading to higher oil consumption. Furthermore, the structure of the turbocharger is complex. Therefore, such turbocharger is not convenient for normal users.

Therefore, there is a need for a simple air-pressure booster, to overcome the above-mentioned disadvantages.

SUMMARY OF THE INVENTION

To solving the above-mentioned disadvantages, the present invention is related to an air-pressure booster and, especially, to an air-pressure booster which could improve efficacy of air input and power output of an engine.

The air pressure booster provides an indirect flow pass and a straight flow pass inside an outer tube. Corresponding to a front end of the flow pass, the air-pressure booster has a tapered neck. The interior space of the tapered neck is communicated with the flow and the indirect flow pass. The present invention may connect to an air inlet of engine, air is sucked into the engine through the flow passes, and a negative pressure generated. When a rapid air is output by the straight flow pass and when a slow air is output by the indirect flow pass, the air will form a swirl in an air space to increase speed and pressure of air input of the engine.

Therefore, the efficiency of the engine will increase, and the fuel waste will decrease The present invention provides a convenient way for increasing the efficiency of an engine. With a simple structure of the present air-pressure booster, air passes the booster without energy providing. The booster of the present invention will improve efficiency of air input and torque of an engine.

DETAILED DESCRIPTION OF THE INVENTION

Figure 1:
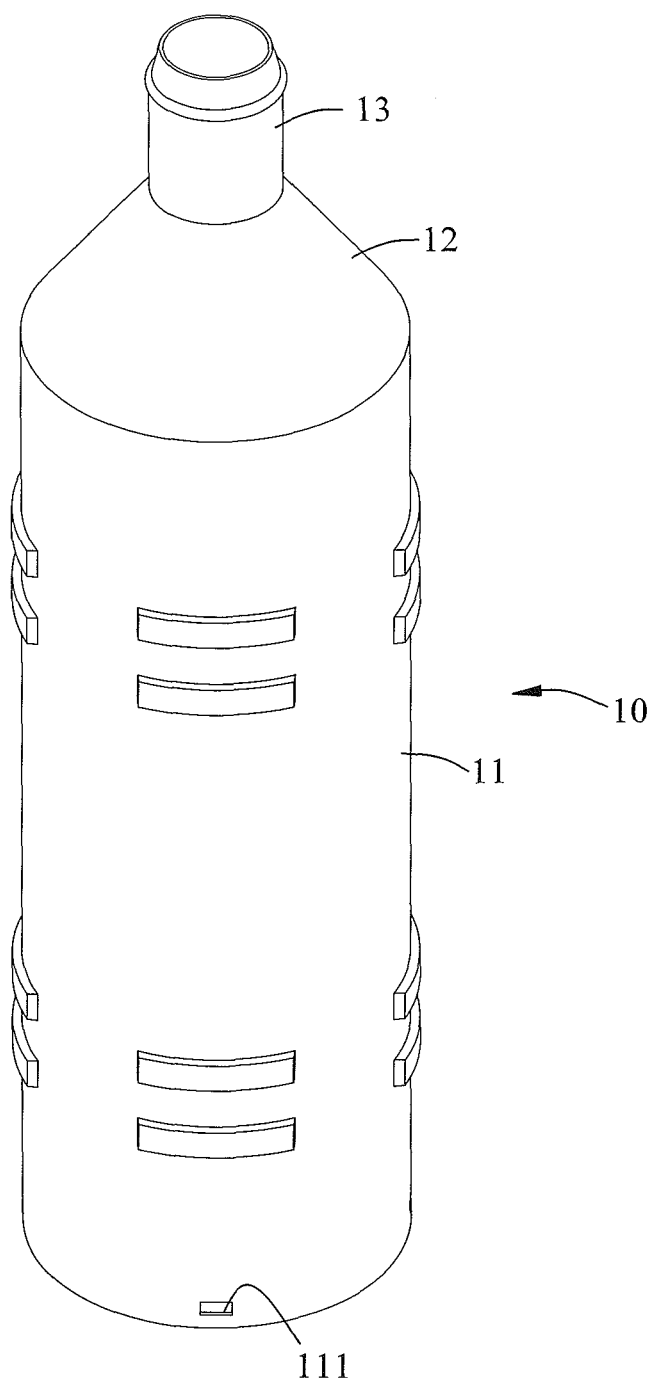
FIG. 1 is a perspective view of a first preferred embodiment of the present invention.

Hereinafter, embodiments of the present invention will be described in detail with reference to the accompanying drawings.

With reference to FIGS. 1 to 5, a first preferred embodiment of the present invention comprises a housing (10) and a flow guide structure (X) embedded inside the housing (10). The flow guide structure (X) comprises, sequentially stacked, a first cap assembly (20), a second cap assembly (22) and a sealing cap (24) embedded inside the housing (10).

The housing (10) has a tube (11) which may be shaped as a cylinder. The tube (11) has four slots (111) being equidistantly formed on a post end of an outer surface of the tube (11). The tapered neck (12) has an inner surface being conical, and the tapered neck (12) is connected with an air output nozzle (13). The diameter of the nozzle (13) is less than the tube (11). The tapered neck (12) and the tube (11) are coaxial.

Figure 2:
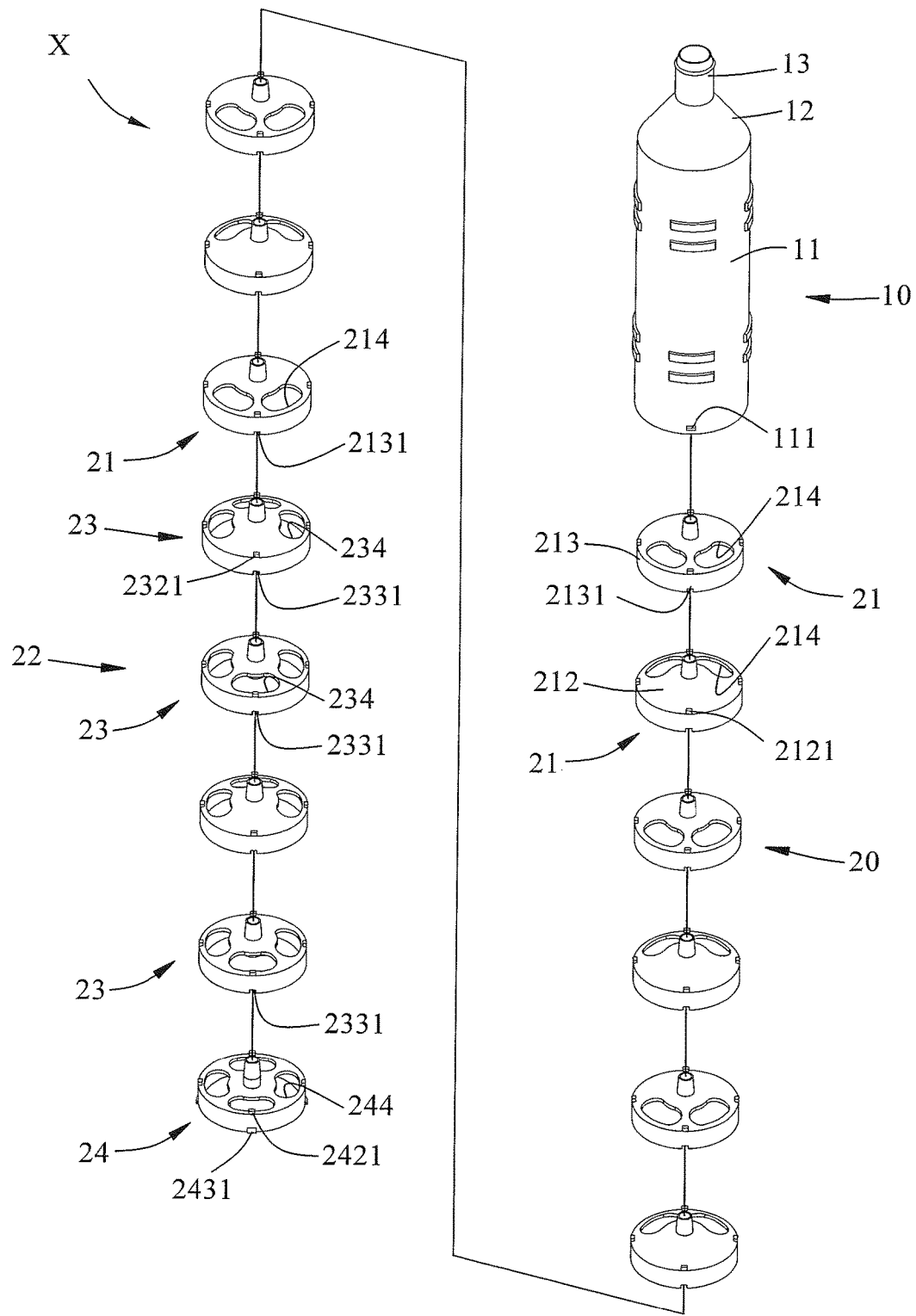
FIG. 2 is an explosive view of a first preferred embodiment of the present invention.
Figure 3:
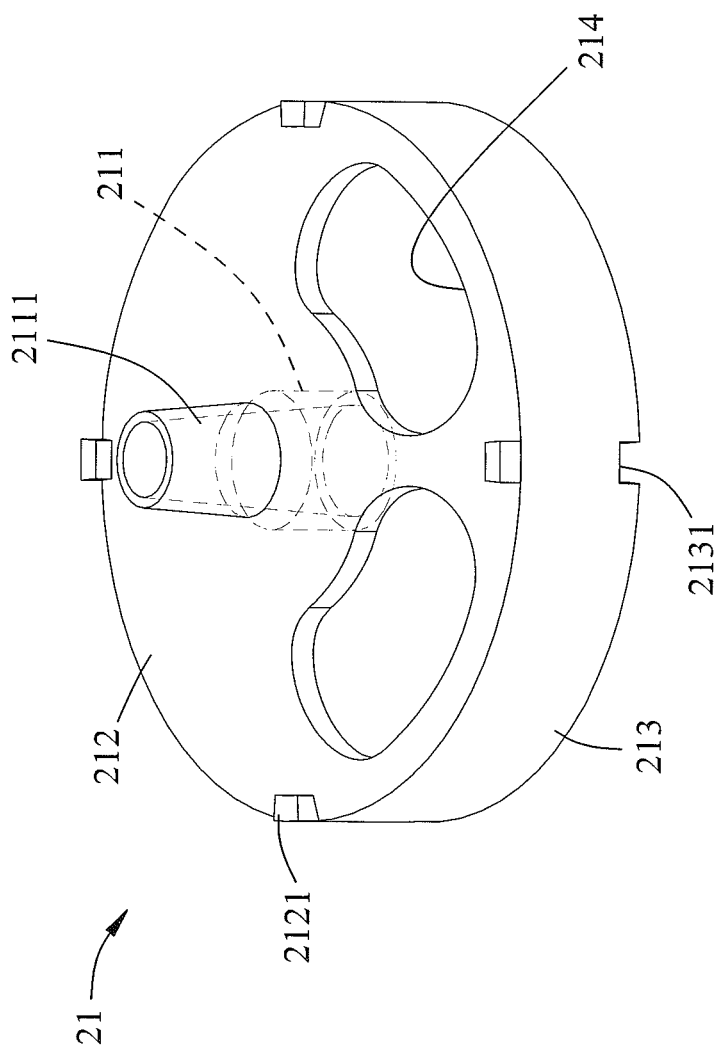
FIG. 3 is a perspective view of a first cap of a first preferred embodiment of the present invention.
Figure 7:
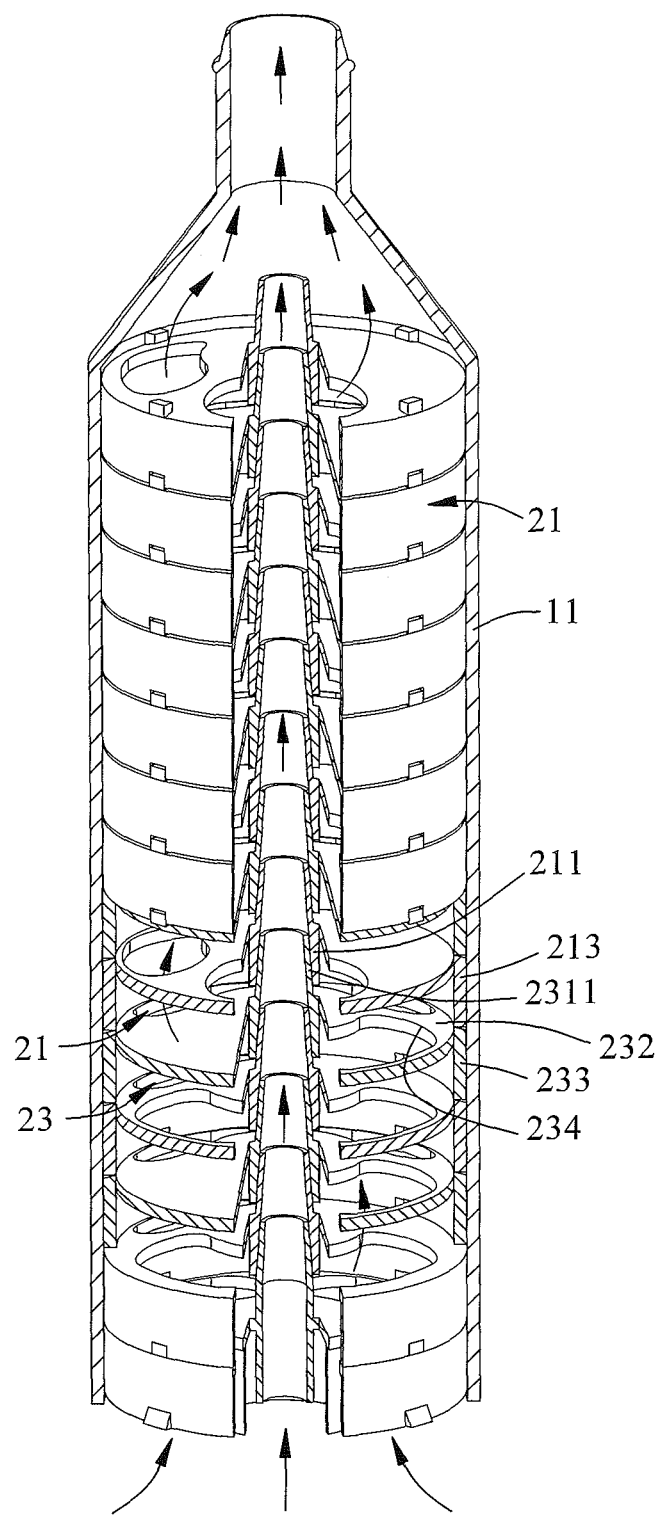
FIG. 7 is a partial sectional view of a first preferred embodiment of the present invention.

With reference to FIGS. 2 and 7, the first cap assembly (20) is inserted inside the tube (11). The first cap assembly (20) comprises 9 first caps (21) being assembled sequentially. With reference to FIG. 3, each first cap (21) has an air inlet (211) being formed at the center of the first cap (21). An inserted neck (2111) is a converging tube formed outward the air inlet (211). Four ridges (2121) are formed equidistantly on a top (212) of the air inlet (211). Four grooves (2131) are formed on a wall (213) of the top (212) corresponding to the ridges (2121). Further, two holes (214) are separately formed on the top (212) at the same side as shown in FIG. 3.

Figure 6:
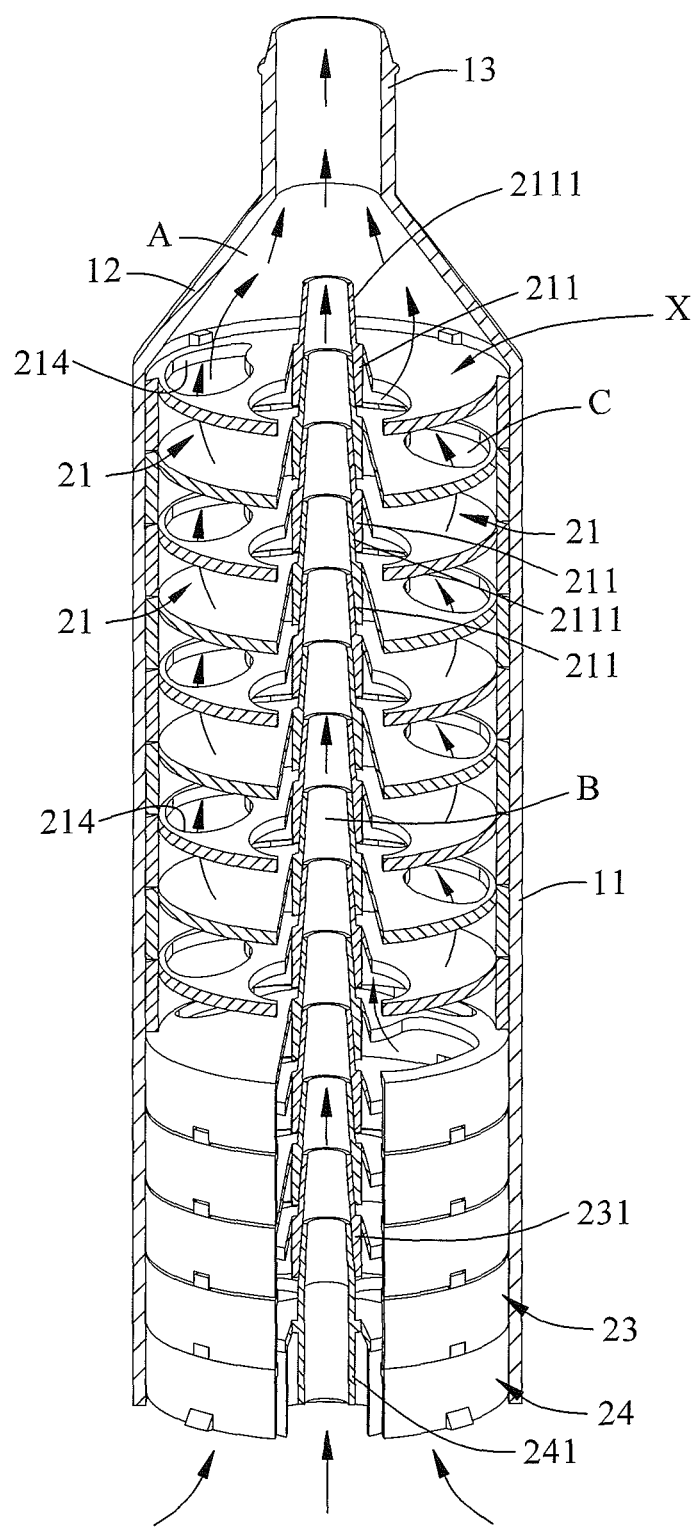
FIG. 6 is a partial sectional view of a first preferred embodiment of the present invention.

With the reference of FIGS. 6 and 7, the inserted neck (2111) is a cone-shape for assembling the cap assembly (20,22,24) to form a direct flow pass (B), and the spacing of each cap (21,23,24) forms an indirect flow pass (C). When the cap assembly (20,22,24) is embedded inside the tube (11), the internal space of the tapered neck (12) forms an air space (A) and the direct flow pass (B) formed by inserted necks (2111) facing to the air output nozzle (13) for air flows.

When each first cap (21) is assembled, the ridges (2121) insert into the corresponding grooves (2131) of the neighboring first cap (21), and the holes (214) on each first cap (21) are staggered at different sides of each cap (21) to form part of the indirect flow pass (C).

Figure 4:
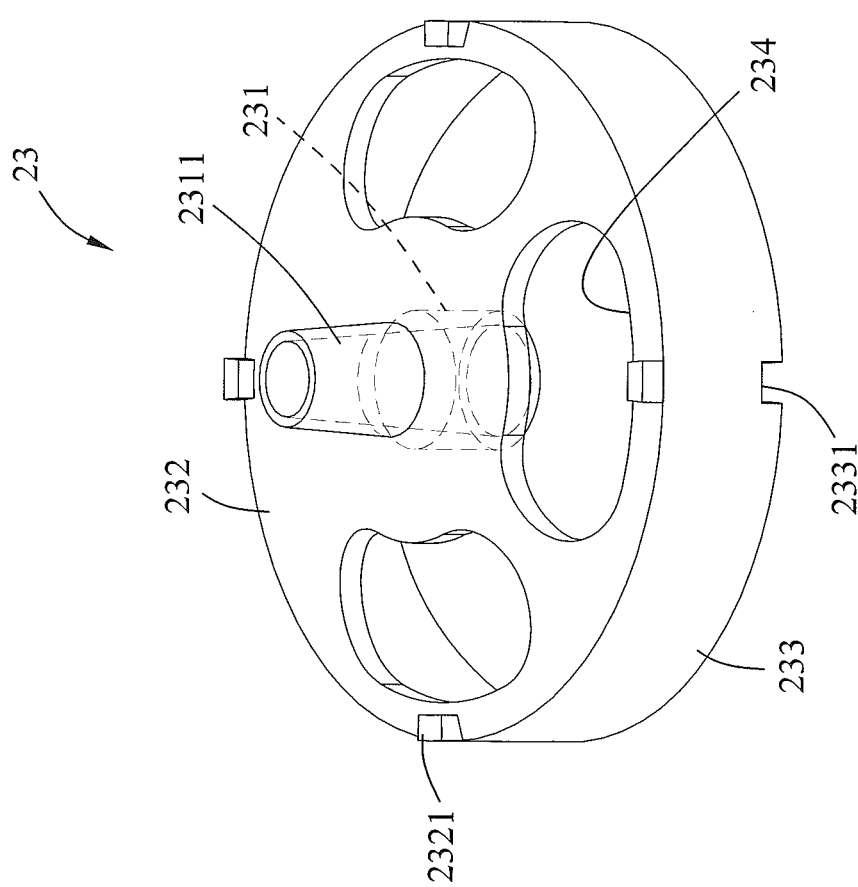
FIG. 4 is a perspective view of a second cap of a first preferred embodiment of the present invention.
Figure 8:
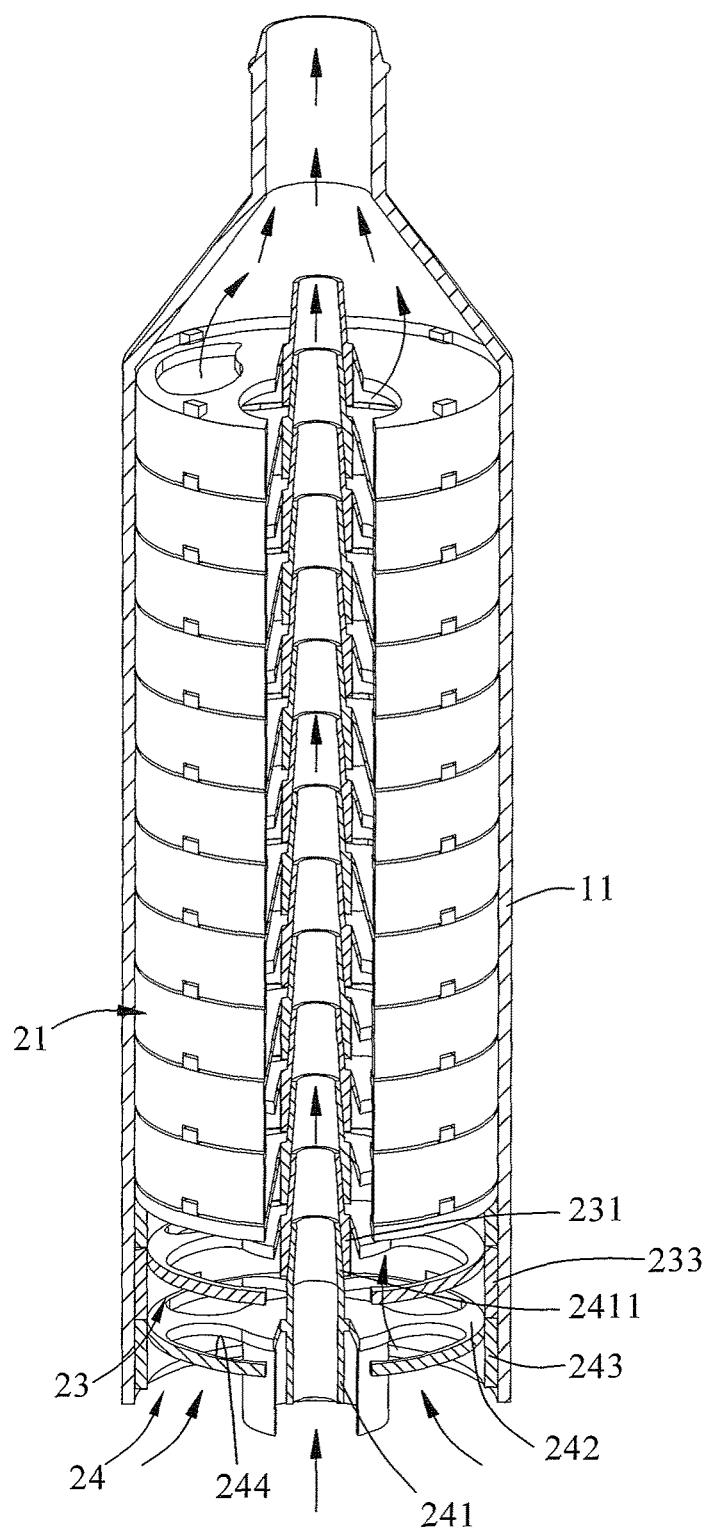
FIG. 8 is a partial sectional view of a first preferred embodiment of the present invention.

With the reference of FIGS. 2 and 8, the second cap assembly (22) has four second caps (23) assembled sequentially. Each second cap (23) also has an air inlet (231) formed at the center of the top (232) and communicated with an inserted neck (2311). Four ridges (2121) are formed equidistantly on the top (232). Four grooves (2331) are formed on the wall (233) of the top (232) corresponding to the ridges (2321). Three holes (234) are separately formed on the top (232) and form an arc-shape with the same center of the air inlet (231) as shown in FIG. 4.

With reference to FIGS. 2 and 7, when each second cap (23) is assembled, the ridges (2321) insert into the corresponding grooves (2331) of the neighboring second cap (23), and the holes (234) on each second caps (23) are staggered at different sides of each cap (23) to form part of the indirect flow pass (C).

Figure 5:
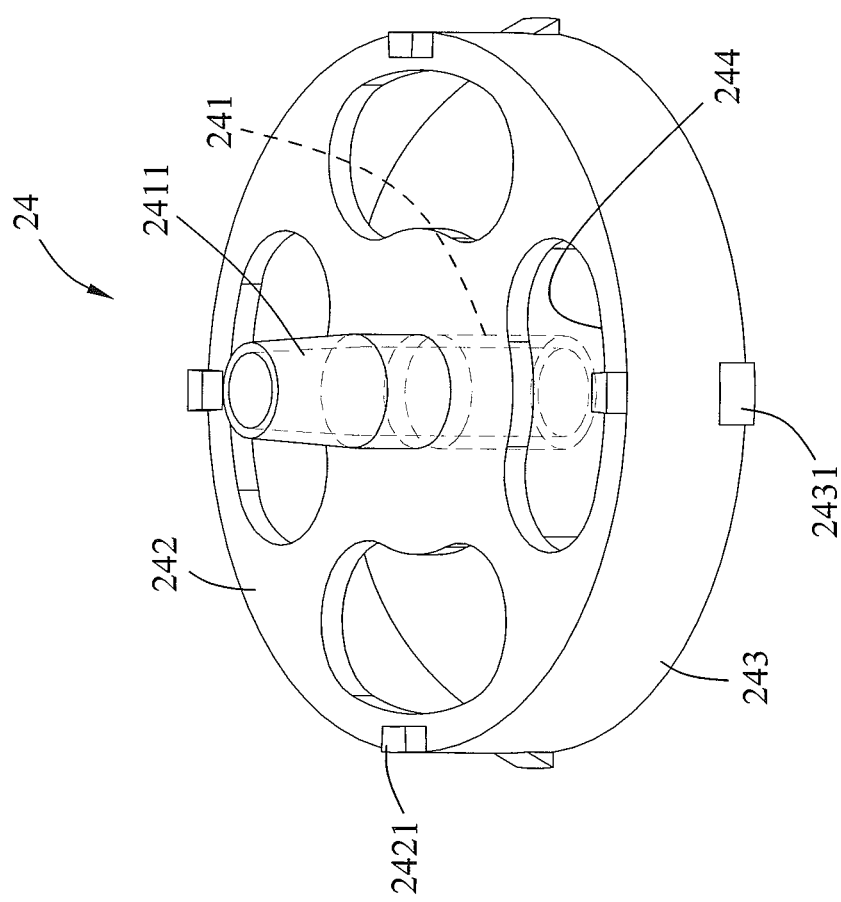
FIG. 5 is a perspective view of a sealing cap of a first preferred embodiment of the present invention.

With reference to FIGS. 2 and 8, the sealing cap (24) is mounted follow by the second cap assembly (22) at the opposite end of the tapered neck (12) of the tube (11). Please refer to FIG. 5, the sealing cap (24) has an air inlet (241) formed at the center of the top (242) and communicated with an inserted neck (2411). Four ridges (2421) are formed equidistantly on the top (242). Four hooks (2431) formed on the wall (243) correspond to four slots (111) formed on the tube (11). Further, four holes (244) are separately formed on the top (242) and form an arc-shape with the same center of the air inlet (241) as shown in FIG. 5.

When the sealing cap (24) is assembled next to the second cap assembly (22), the ridges (2421) are inserted into the corresponding grooves (2331) of the neighboring second cap (23), and the hooks (2431) on the sealing cap (24) hook the slots (111) of the tube (11) to mount cap assembly (20,22,24) inside the tube (11).

With reference to FIG. 6, the indirect flow pass (C) is formed by each part of the flow guide structure (X), and the direct flow pass (B) is formed by each air inlet (211,231, 241). The length of the indirect flow pass (C) is longer than the direct flow pass (B).

In a preferred embodiment of the present invention, the amounts of the first caps (21) may be 9, but not limited as 1, 3, 5,10 or the like. Further, the holes (214) formed on the first caps (21) may be one and more, and the shape and the size of the holes (214) is not limited. In another preferred embodiment of the present invention, the amounts of the second caps (23) may be 4, but not limited as 1 or 3 or the like. Further, the holes (234) formed on the second caps (23) may be one and more, and the shape and the size of the holes (234) is not limited.

Furthermore, the shape of the housing (10) is not limited to a cylinder tube, as other kinds of shapes are allowed, such as a square tube, and shapes of the cap assembly (20, 22, 24) are also changed to correspond to the housing (10). To improve the clearance of the air, a filter may be mounted following the sealing cap (24).

In the first preferred embodiment of the present invention, the sealing cap (24) may be optionally mounted inside the tube (11). The cap assembly (20, 22) may be directly mounted inside the tube (11), such as by bonding or welding.

Figure 9:
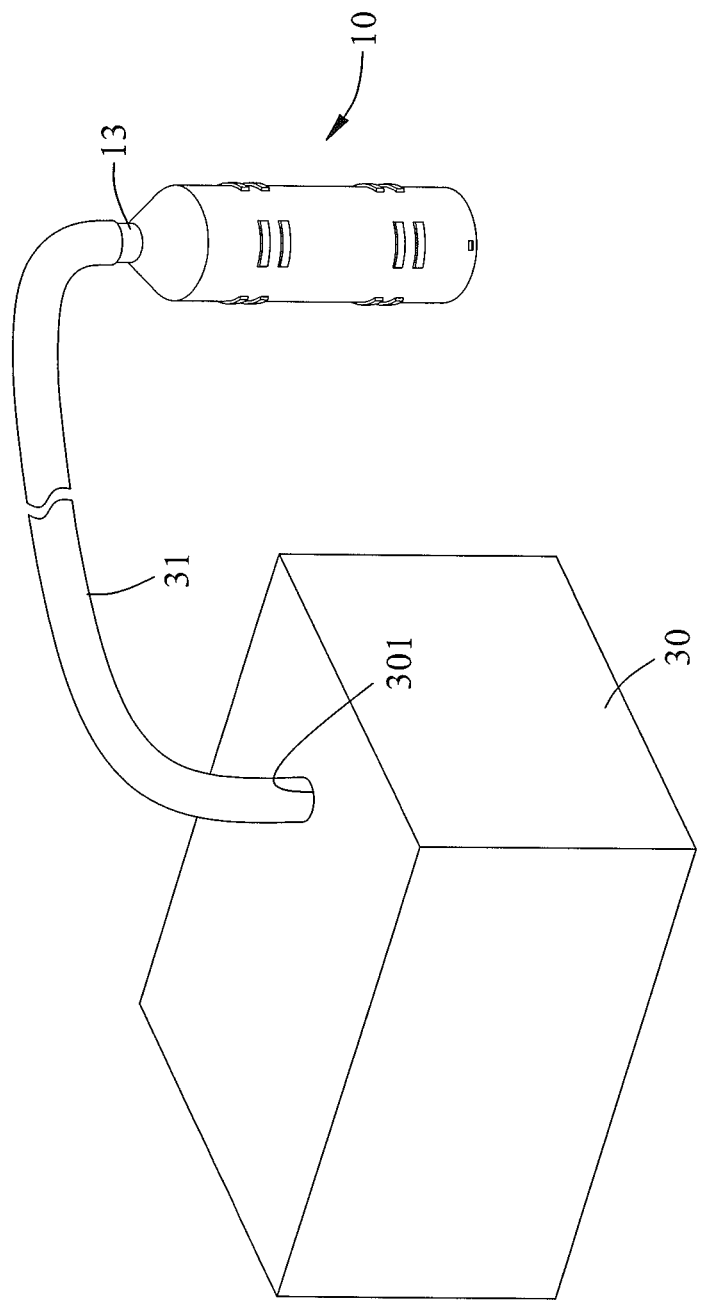
FIG. 9 is a perspective view of a first preferred embodiment of the present invention when connected to an engine.
Figure 10:
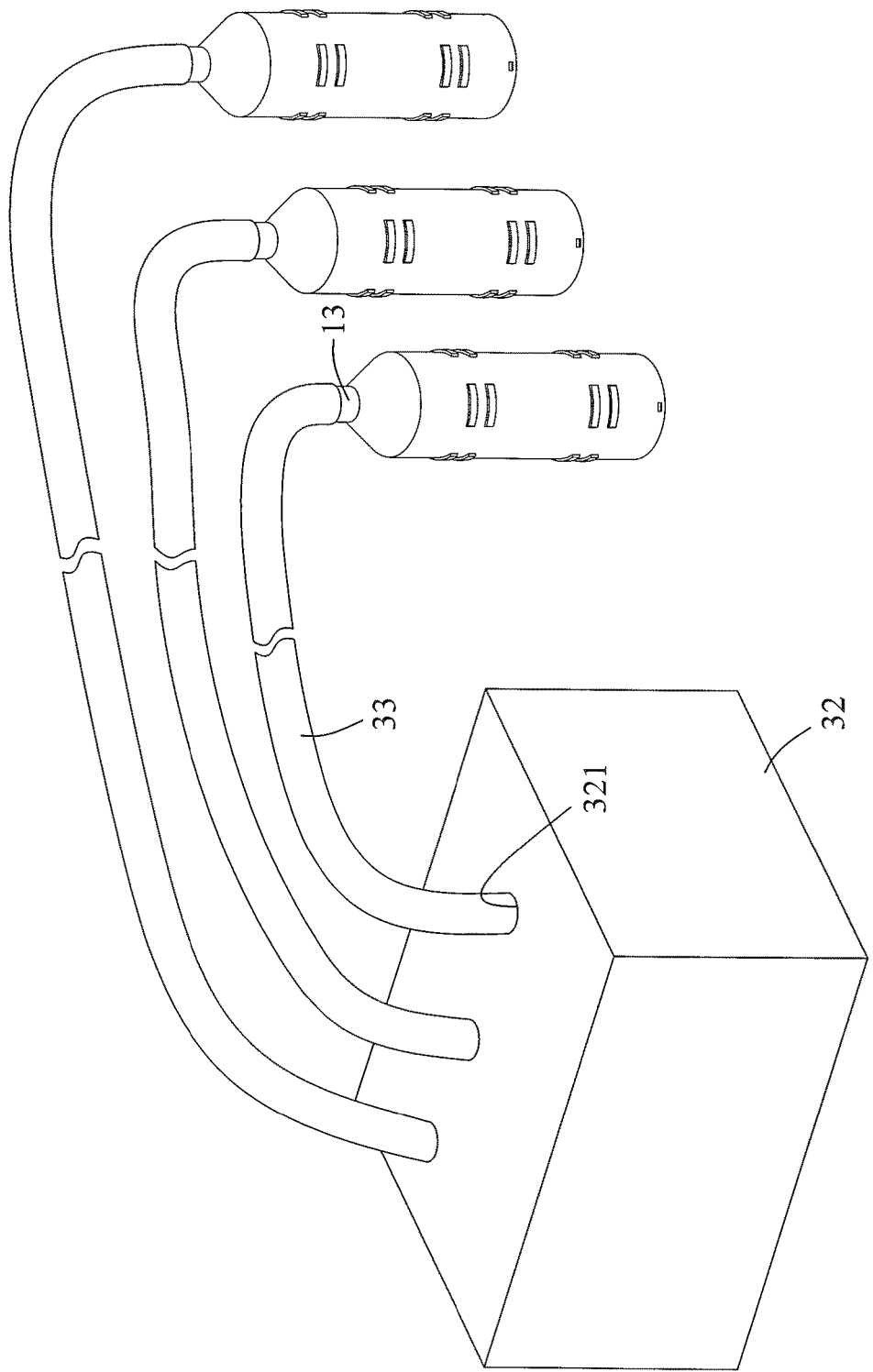
FIG. 10 is a perspective view of a first preferred embodiment of the present invention when connected to an engine.

With reference to FIG. 9, the air-pressure booster of the present invention is mounted on an engine (30) through an air inlet nozzle (301). An air intake pipe (31) may be used for communicating the air output nozzle (13) of the air-pressure booster and the air inlet nozzle (301) of the engine (30). With reference to FIG. 10, multiple air-pressure boosters may be applied to an engine (32) with multiple air inlet nozzles (321) through air intake pipes (33).

When the engine (30,32) is working, a negative air pressure is formed, and a force sucks air into the air-pressure booster of the present invention. Air will pass by the indirect flow pass (C) and direct flow pass (B) and then flow into the engine (30, 32).

Because the length of the indirect flow pass (C) is longer than the direct flow pass (B) and the amounts of holes (244, 234, 214) on the caps (24, 23, 21) are reduced sequentially, the rate of air flow will become lower and finally flows in the air space (A). The air flow may speed up by colliding the inner surface of the tapered neck (12), and, then, the air outputs by a spiral from the air output nozzle (13). Further, the direct flow pass (B) is straight, the length is shorter than the indirect flow pass (C), and the air pass by direct flow pass (B) will be faster to output from the nozzle (13).

Due to the air flow rates of the direct flow pass (B) and indirect flow pass (C) are different, the air forms as a whirlpool and speeds up the rate and the pressure of the air output. By connecting to the working engine (30, 31) which forms a low pressure to increase efficiency of air intake, the fuel will be used efficiently, and the fuel consumption of the engine is decreased. Moreover, the power output of the engine is also increased because of higher air input efficiency.

Figure 11:
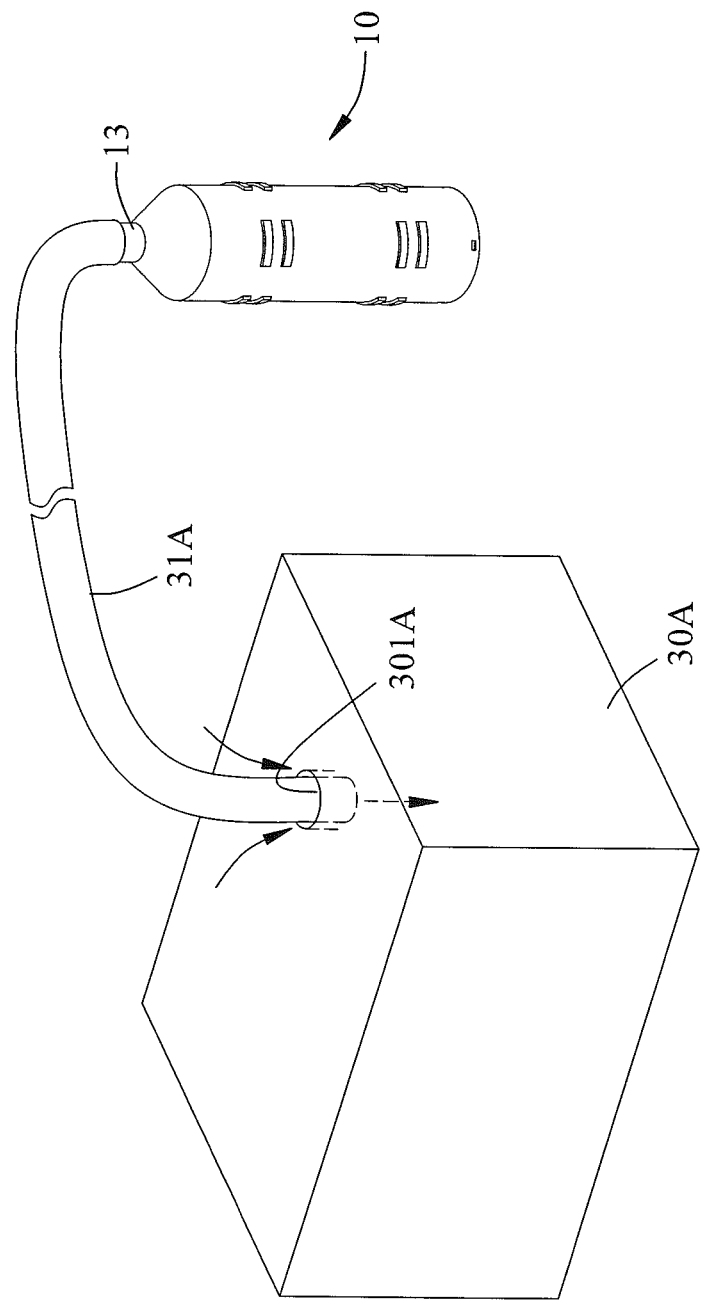
FIG. 11 is a perspective view of a first preferred embodiment of the present invention when connected to an engine.
Figure 12:
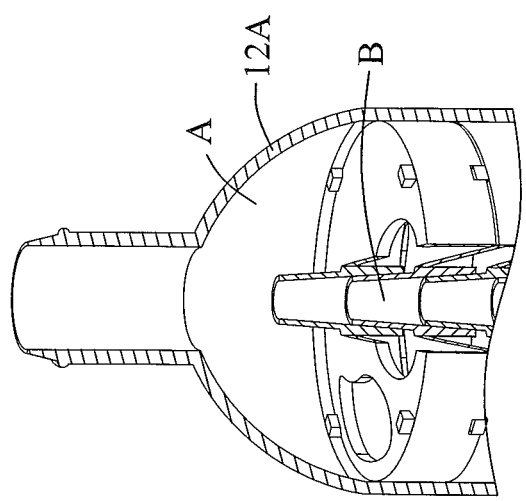
FIG. 12 is a partial sectional view of a second preferred embodiment of the present invention.

With reference to FIG. 11, the air-pressure booster of the present invention may be directly or indirectly mounted on the engine (30A) with an air inlet nozzle (301A) through air intake pipe (31A).

In a second preferred embodiment of the present invention, the shape of the tapered neck (12A) may be hemispherical.

In the first and second preferred embodiments of the present invention, the flow guide structure (X) comprises a direct flow pass (B) and an indirect flow pass (C) which are formed by the first cap assembly (21), the second cap assembly (23) and the sealing cap (24). The flow guide structure (X) also may be formed by other types of the direct flow pass (B) and the indirect flow pass (C) as shown in the following third, fourth and fifth preferred embodiments to generate a flow whirlpool and to increase air flow rate and air pressure.

Figure 13:
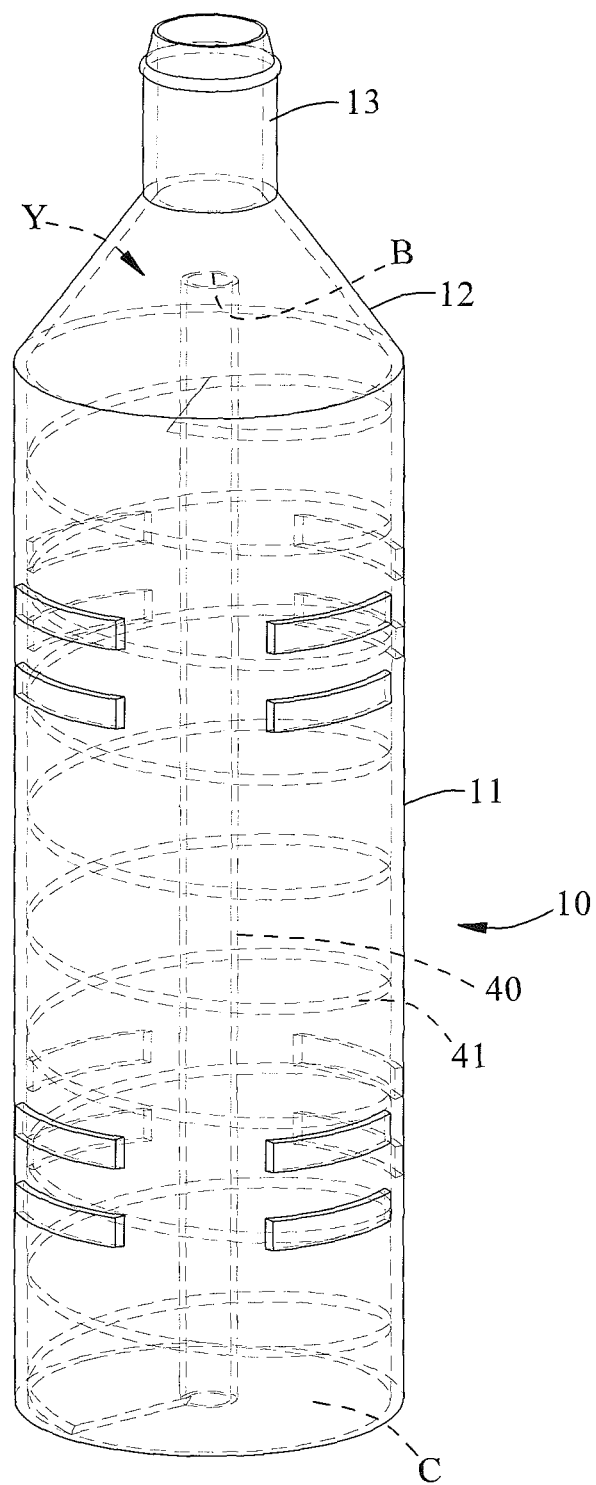
FIG. 13 is a perspective view of a third preferred embodiment of the present invention.
Figure 14:
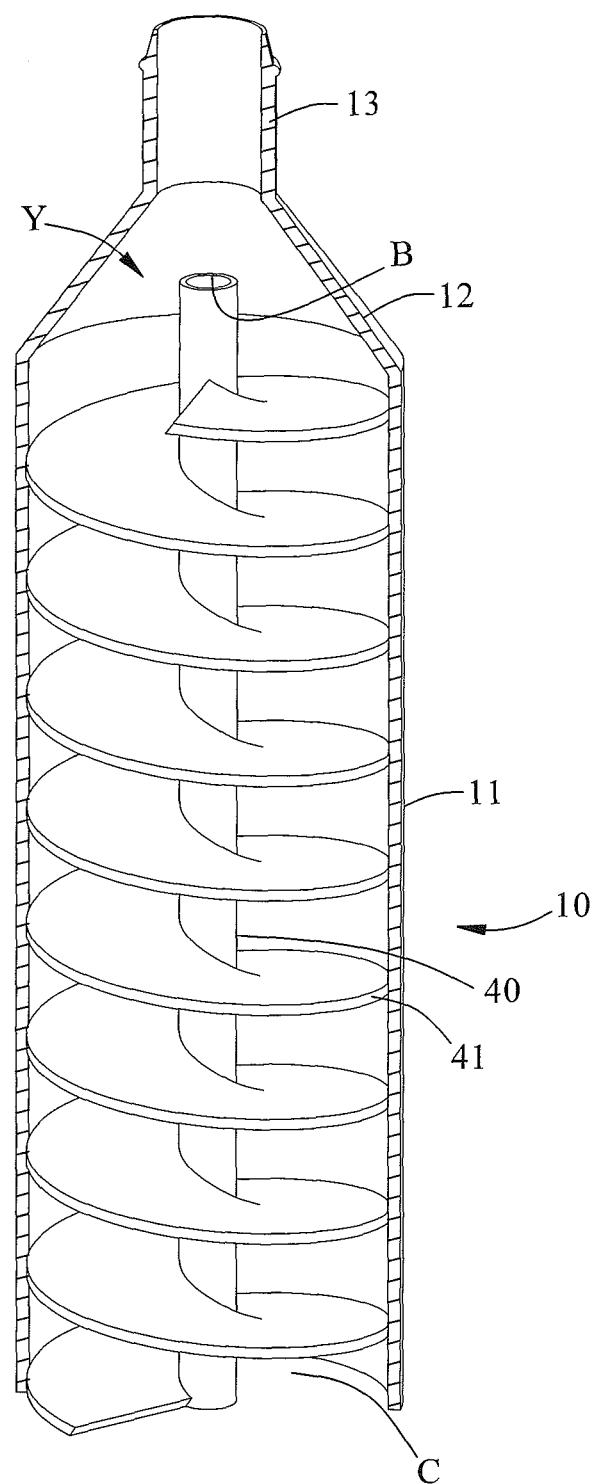
FIG. 14 is a partial sectional view of a third preferred embodiment of the present invention.

With reference to FIGS. 13 and 14, the third preferred embodiment of the present invention, the housing (10) may be the same as shown in the first preferred embodiment.

The flow guide structure (Y) is formed by a central tube (40) and a spiral van (41). The location of the central tube (40) is mounted at the axial center of the tube (11) as the direct flow pass (B). The diameter of the central tube (40) is less than the air output nozzle (13). The spiral van (41) is mounted on the outer surface of the central tube (40) like a spiral ladder and forms the indirect flow pass (C). The surface of the spiral van (41) may be a rough surface. The length of the indirect flow pass (C) is longer than the direct flow pass (B).

When the third preferred embodiment of the present invention is used, the air flow rate from the indirect flow pass (C) is lower than the air rate from the direct flow pass (B). Further, the rough surface of the spiral van (41) will slow down the air rate generated from the indirect flow pass (C). Due to the different rates generated by the indirect flow pass (C) and the direct flow pass (B), the air will form the whirlpool in the inner space of the tapered neck (12) to enhance the output force and the rate.

The length of the central tube (40) of the third preferred embodiment of the present invention may be equal to the tube (11) or longer than the tube (11) for extending outside to the tube (11).

Figure 15:
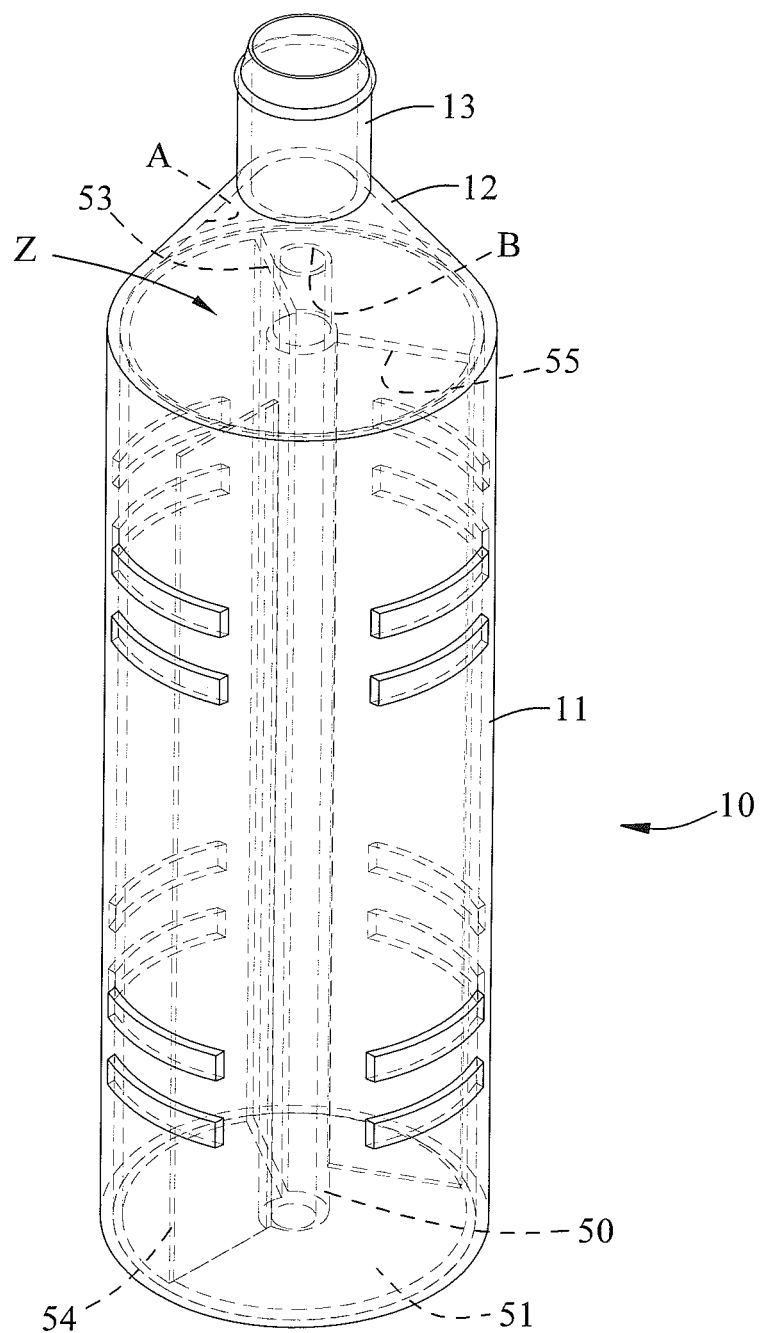
FIG. 15 is a perspective view of a forth preferred embodiment of the present invention.
Figure 16:
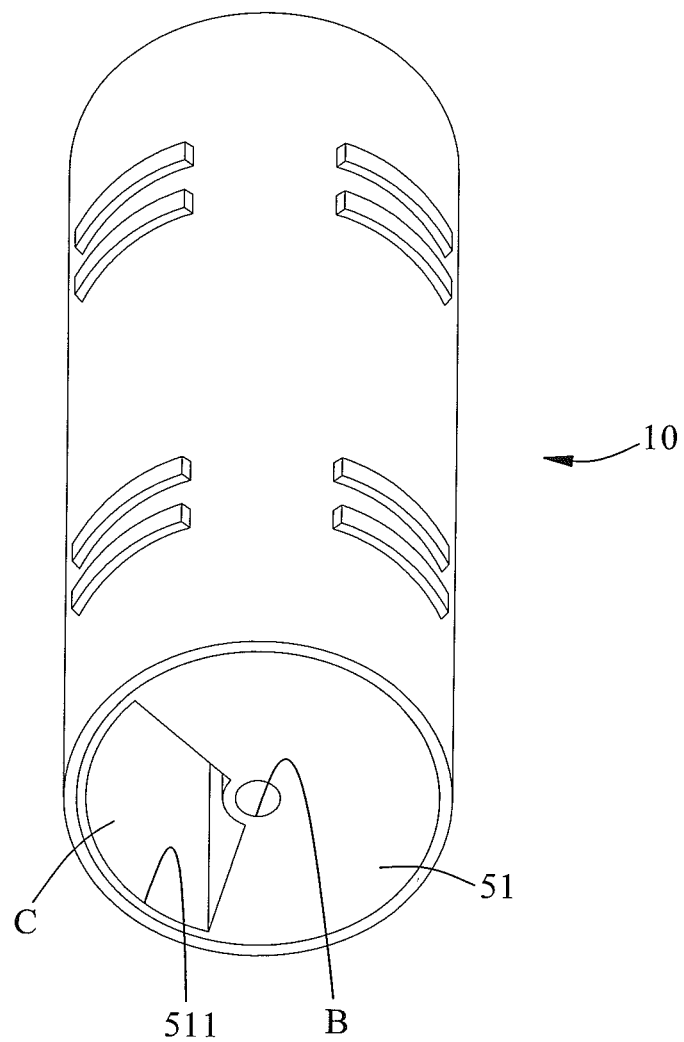
FIG. 16 is an upward perspective view of a forth preferred embodiment of the present invention.
Figure 17:
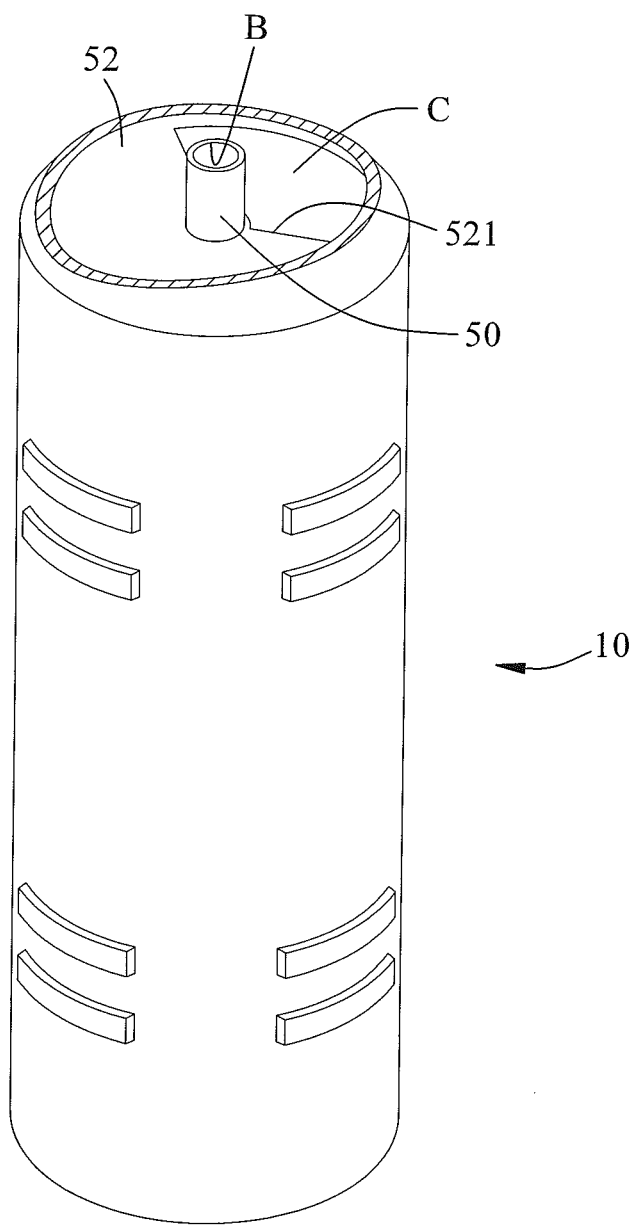
FIG. 17 is a vertical and partial sectional view of a forth preferred embodiment of the present invention.

With reference to FIGS. 15 to 17, the fourth preferred embodiment of the present invention, the flow guide structure (Z) comprises a central tube (50), a post-sealing board (51), a front sealing board (52), a first partition (53), a second partition (54) and a third partition (55). The surfaces of the partitions (53, 54, 55) may be rough surfaces. The location of the central tube (50) is mounted at the axial center of the tube (11) as the direct flow pass (B), and extends into the air space (A) of the tapered neck (12).

The post-sealing board (51) is mounted inside one end of the tube (11) opposite the tapered neck (12), and has a post-opening (511) formed on the board (51). The front sealing board (52) is mounted inside at the end of the tube (11) nearby the tapered neck (12), and has a front-opening (521) formed on the board (52). The first partition (53), the second partition (54) and the third partition (55) are mounted vertically and inside the tube (11) at equal intervals. The ends of the first partition (53) connect to the post-sealing board (51) and the front sealing board (52), respectively. One end of the second partition (54) is mounted on the post-sealing board (51), and the post-opening (511) is formed between the second partition (54) and the third partition (51). A gap is formed between the second partition (54) and the front sealing board (52). One end of the third partition (55) is mounted on the front sealing board (52), and the front-opening (521) is formed between the second partition (54) and the third partition (55). A gap is formed between the third partition (55) and the post-sealing board (51). The indirect flow pass (C) is formed between the post-opening (511) and the front-opening (521), and communicates with the air space (A). The distance of the indirect flow pass (C) is longer than the direct flow pass (B).

When the fourth preferred embodiment is used, reciprocating air passes the indirect flow pass (C) at a vertical direction. Since the distance of the indirect flow pass (C) is longer than the direct flow pass (B), the air rate generated by the indirect flow pass (C) is lower than the air rate generated by the direct flow pass (B). Further, the rough surfaces of the partitions (53-55) also slow down the air rate generated by the indirect flow pass (C). Due to the different rates generated by the indirect flow pass (C) and the direct flow pass (B), the air will form a whirlpool in the inner space of the tapered neck (12) to enhance the output force and the rate.

The length of the central tube (50) of the fourth preferred embodiment of the present invention may be equal to the tube (11) or longer than the tube (11) for extending outside the tube (11).

Figure 18:
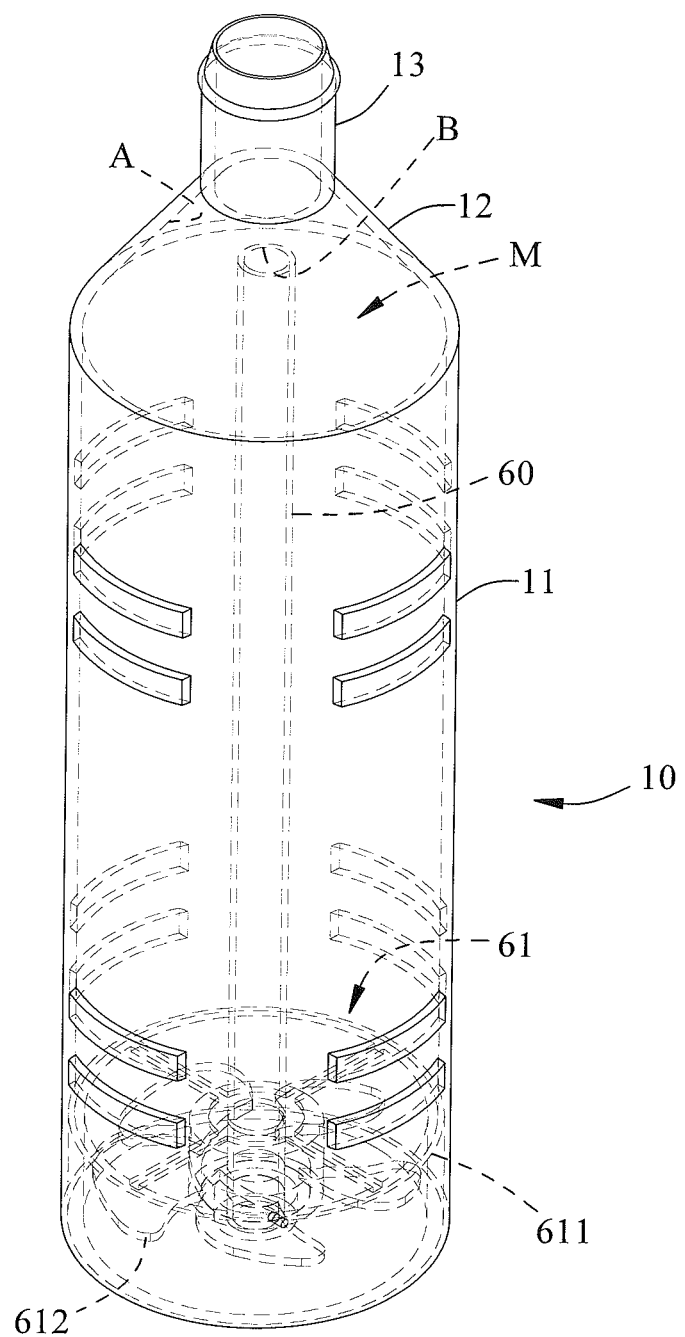
FIG. 18 is a perspective view of a fifth preferred embodiment of the present invention.
Figure 19:
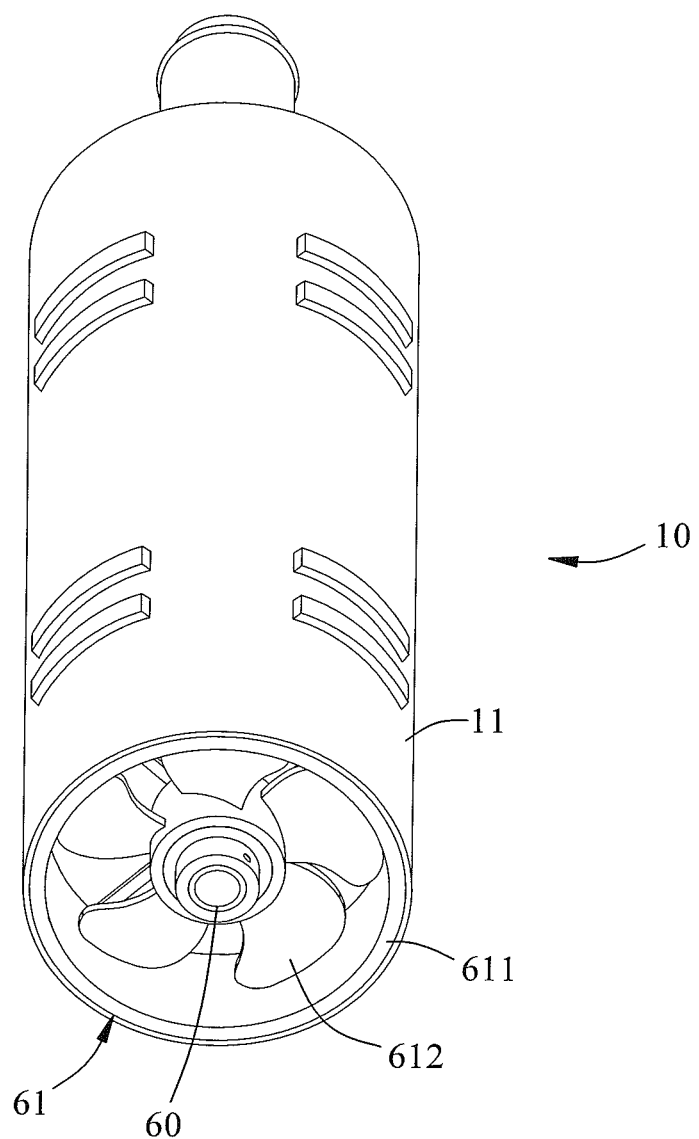
FIG. 19 is an upward perspective view of a fifth preferred embodiment of the present invention.
Figure 20:
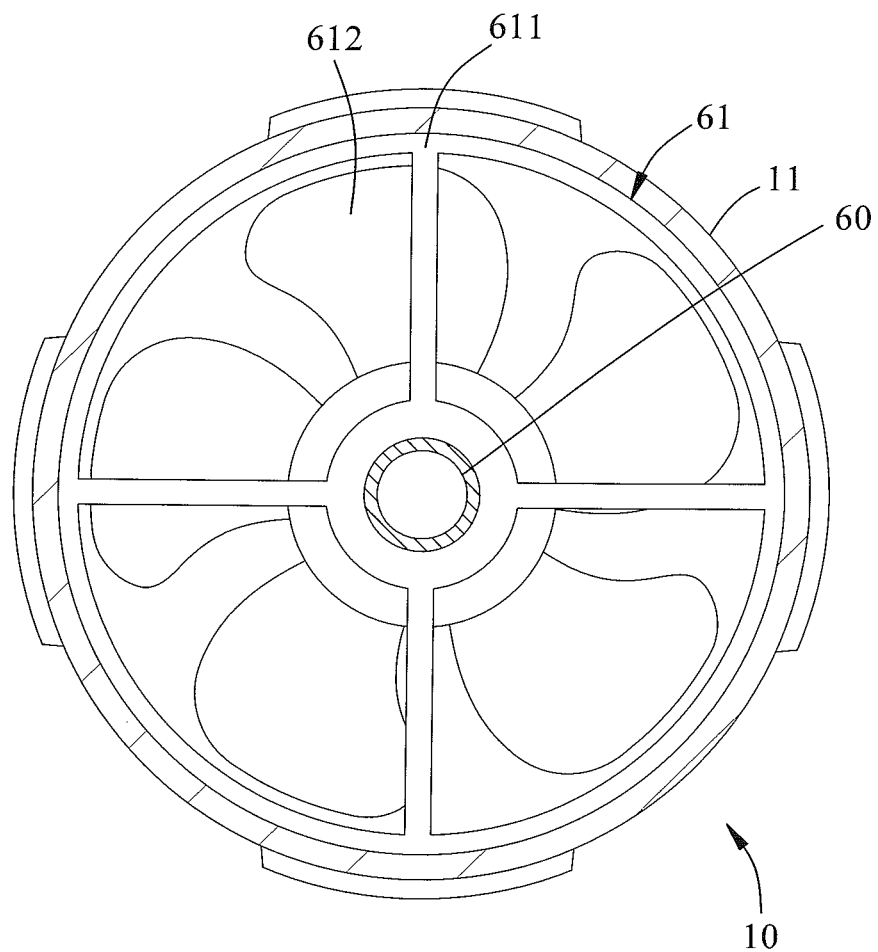
FIG. 20 is a vertical sectional view of a fifth preferred embodiment of the present invention.

With reference to FIGS. 18 to 20, a fifth preferred embodiment of the present invention is shown. The air-pressure booster of the fifth preferred embodiment has a housing (10) similar to the first preferred embodiment. The tube (11) shown in the fifth preferred embodiment has a flow guide structure (M) which comprises a central tube (60), and a fan is mounted on one end of the central tube (60) opposite to the tapered neck (12). The central tube (60) forms the direct flow pass (B).

The fan (61) has a frame (611) for mounting between the inner surface of the tube (11) and the central tube (60). The central tube (60) is mounted through the center of the frame (611). Multiple vans (612) are rotatable mounted on the central tube (60).

When the fifth preferred embodiment is used, air passes the fan (61) and becomes a vortex force. Since the vortex moving distance is longer than the direct flow pass (B), the air rate generated by the vortex is lower than the air rate generated by the direct flow pass (B). Due to the different rates generated by the vortex and the direct flow pass (B), the air will form a whirlpool in the inner space of the tapered neck (12) to enhance the output force and the rate.

In a preferred embodiment, one and more of the fans (61) may be set inside the tube (11).

In another preferred embodiment, the length of the central tube (60) of the fifth preferred embodiment of the present invention may be equal to the tube (11) or longer than the tube (11) for extending outside the tube (11).

Figure 21:
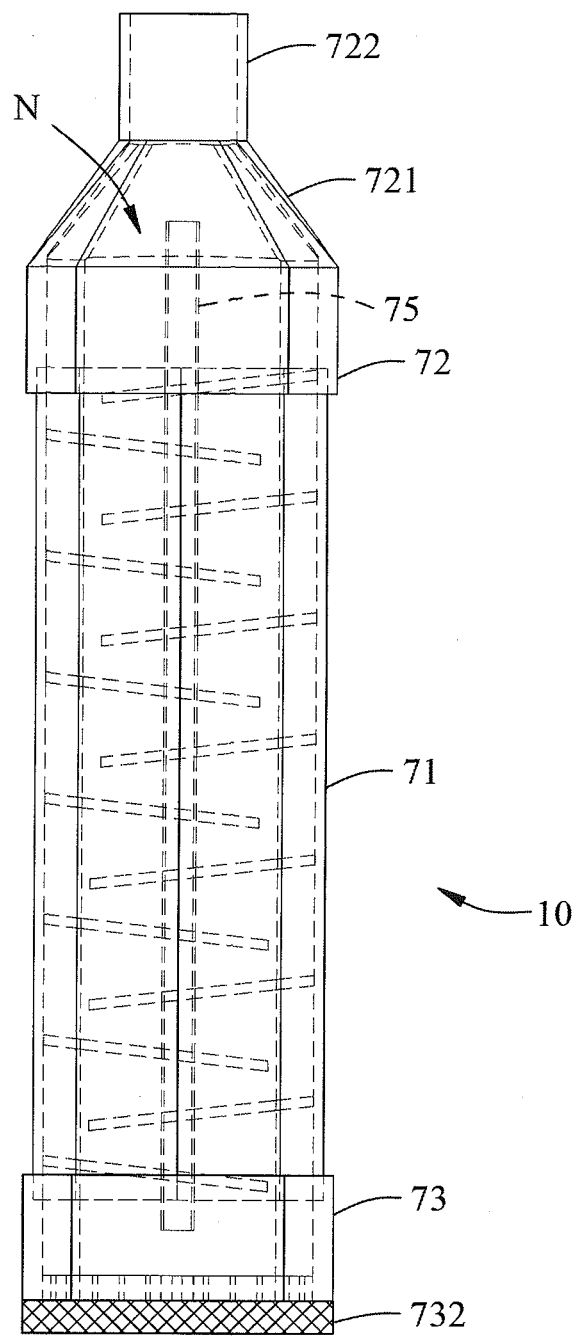
FIG. 21 is a plan view of a sixth preferred embodiment of the present invention.
Figure 22:
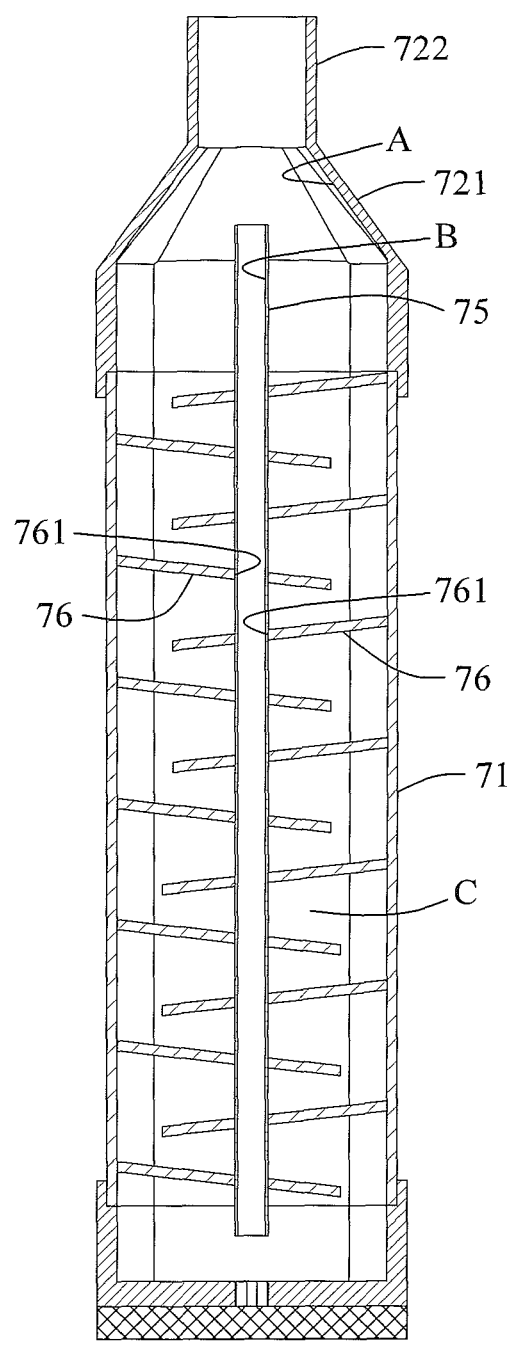
FIG. 22 is a sectional view of a sixth preferred embodiment of the present invention.
Figure 23:
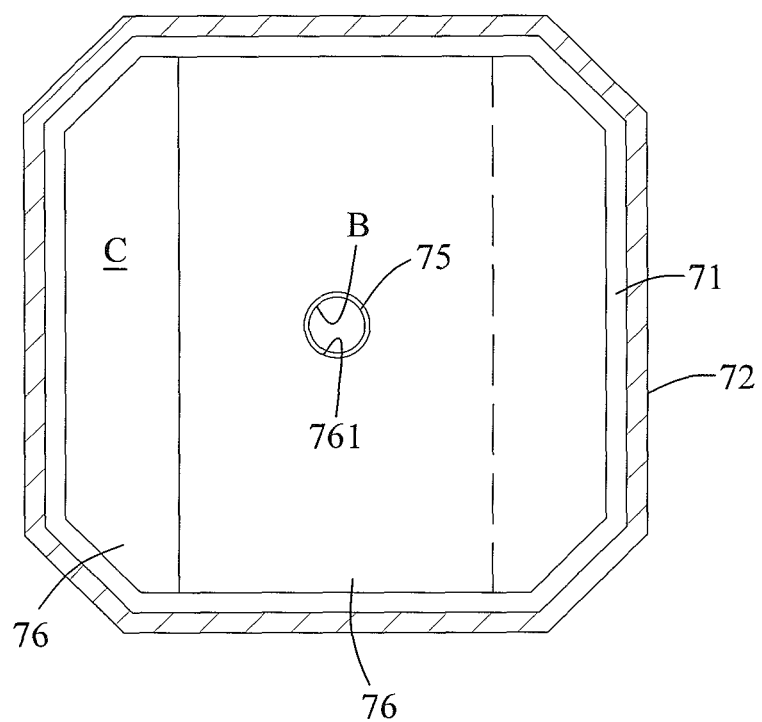
FIG. 23 is a vertical sectional view of a sixth preferred embodiment of the present invention.

With reference to FIGS. 21 to 23, the sixth preferred embodiment of the present invention is shown. The air-pressure booster of the present invention has a housing (70) and a flow guide structure (N) formed inside the housing (70).

The housing (70) has a tube (71) with a front end and a post end, a cap (72) and a sealing cap (73). The cap (72) is mounted on the front end of the tube (71), and the cap (72) has a tapered neck (721) and an air output nozzle (722) communicated with the tapered neck (72). An air space (A) is formed inside the tapered neck (721). The sealing cap (73) is mounted on the post end of the tube (71) and may have a filter (732).

The flow guide structure (N) has a central tube (75) and multiple sheets (76) around the central tube (75). The location of the central tube (75) is mounted at the axial center of the tube (71) as the direct flow pass (B), and extends into the air space (A) of the tapered neck (72) facing the air output nozzle (73).

The multiple sheets (76) are sheets mounted separately inside the tube (71). The ends of adjacent sheets (76) are located at opposite inner surfaces of the tube (71), and have gaps between the free ends of the sheets (76) to form the indirect flow pass (C) communicating with the air space (A). Each sheet (76) has a mounting hole (761) for the central tube (75) to pass through. The surfaces of each sheet (76) are rough surface. The distance of the indirect flow pass (C) is longer than the direct flow pass (B).

When the sixth preferred embodiment is used, air passes the indirect flow pass (C) and the direct flow pass (B). Since the distance of the indirect flow pass (C) is longer than the direct flow pass (B), the air rate generated by the indirect flow pass (C) is lower than the air rate generated by the direct flow pass (B). Further, the rough surfaces of the sheets (76) also slow down the air rate generated by the indirect flow pass (C). Due to the different rates generated by the indirect flow pass (C) and the direct flow pass (B), the air will form a whirlpool in the inner space of the tapered neck (72) to enhance the output force and the rate.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air-pressure booster comprising:
   a tube with a front end, a post end and a tapered neck communicating with the tube at the front end, with the tapered neck having an air output nozzle, and with an air space inside the tapered neck communicated with the air output nozzle; and
   a flow guide structure mounted inside the tube and having an indirect flow pass and a direct flow pass extending through a center of the flow guide structure, with the indirect and direct flow passes communicating with the air space and the air output nozzle, wherein an air moving distance of the indirect flow pass is longer than the direct flow pass, wherein the direct flow pass is formed at an axial center of the tube, wherein the indirect flow pass is formed around the direct flow pass, wherein the indirect flow pass is a reciprocating type, and wherein the indirect and direct flow passes communicates with the post end of the tube.

2. The air-pressure booster of claim 1, wherein the indirect flow pass is a spiral type, and both flow passes communicates with the post end of the tube.

3. The air-pressure booster of claim 1, wherein the flow guide structure comprises front and neighbor cap assemblies sequentially, with an air inlet formed at a center of each cap assembly, wherein one or more holes are formed on a top of each cap assembly, wherein a wall of each cap assembly is engaged inside an inner surface of the tube, wherein the air space is formed by the front cap assembly and the tapered neck, wherein the air inlet of the front cap assembly is inserted into the air space and faces the air output nozzle, and wherein the indirect flow pass is formed by the holes on each cap assembly, and wherein the holes on the neighbor cap are set at an opposite side to form a spiral of the indirect flow pass.

4. The air-pressure booster of claim 3, wherein the top of each cap assembly is mounted around the air inlet, wherein the wall of each cap assembly is extended from the top, wherein one or more ridges are formed on the wall, and wherein one or more grooves are formed on the wall and correspond to the ridges for hooking the neighbor cap.

5. The air-pressure booster of claim 4, wherein the front cap assembly is mounted near the tapered neck and has two holes, wherein the neighbor cap assembly has three holes, and further comprising a sealing cap mounted following after the neighbor cap assembly has one or more holes, wherein the sealing cap has an air inlet communicated with the air inlets of the cap assemblies, and multiple hooks formed on a wall of the sealing cap for engaging with the tube.

6. The air-pressure booster of claim 1, further comprising a sealing cap having a filter formed on the sealing cap.

7. An air-pressure booster comprising:
   a tube with a front end, a post end and a tapered neck communicating with the tube at the front end, with the tapered neck having an air output nozzle, and with an air space inside the tapered neck communicated with the air output nozzle; and
   a flow guide structure mounted inside the tube and having an indirect flow pass and a direct flow pass extending through a center of the flow guide structure, with the indirect and direct flow passes communicating with the air space and the air output nozzle, wherein an air moving distance of the indirect flow pass is longer than the direct flow pass, wherein the flow guide structure has a central tube, a post sealing board, a front sealing board, a first partition, a second partition and a third partition, wherein the central tube is mounted inside the tube axially, wherein a diameter of the central tube is less than the air output nozzle, wherein one end of the central tube extends into the air space and faces the nozzle;
   wherein the post sealing board is mounted at the post end of the tube and the central tube, wherein the front sealing board is mounted at the front end of the tube and the central tube;
   wherein the first partition, the second partition and the third partition are separately and vertically mounted around the central tube and have gaps between the inner surface of the tube, wherein the first partition is connected to the post sealing board and the front sealing board, wherein the second partition is connected to the post sealing board and has a gap between the front sealing board and a front-opening is formed on the post sealing board between the first partition and the second partition, the third partition is connected to the front sealing board and has a gap between the post sealing board and a post-opening is formed on the front sealing board between the first partition and the third partition; and the indirect flow pass is formed between the post-opening and the front-opening.

8. An air-pressure booster comprising:
   a tube with a front end, a post end and a tapered neck communicating with the tube at the front end, with the tapered neck having an air output nozzle, and with an air space inside the tapered neck communicated with the air output nozzle; and
   a flow guide structure mounted inside the tube and having an indirect flow pass and a direct flow pass extending through a center of the flow guide structure, with the indirect and direct flow passes communicating with the air space and the air output nozzle, wherein an air moving distance of the indirect flow pass is longer than the direct flow pass, wherein the flow guide structure comprises a central tube and a fan mounted on the central tube, wherein the central tube is mounted inside the tube axially to form the direct flow pass, wherein a diameter of the central tube is less than the air output nozzle, wherein one end of the central tube extends into the air space and faces the air output nozzle; and
   wherein the fan has a frame mounted between an inner surface of the tube and an outer surface of the central tube and vans rotatable mounted on the central tube.

9. The air-pressure booster of claim 8, wherein the direct flow pass is formed at the axial center of the tube, wherein the indirect flow pass is formed around the direct flow pass.

10. An air-pressure booster comprising:
    a tube with a front end, a post end and a tapered neck communicating with the tube at the front end, with the tapered neck having an air output nozzle, and with an air space inside the tapered neck communicated with the air output nozzle;

a flow guide structure mounted inside the tube and having an indirect flow pass and a direct flow pass extending through a center of the flow guide structure, with the indirect and direct flow passes communicating with the air space and the air output nozzle, wherein an air moving distance of the indirect flow pass is longer than the direct flow pass;

a cap mounted at the front end of the tube;

a sealing cap mounted at the post end of the tube, wherein the cap has the tapered neck and the air output nozzle communicated with the tapered neck;

a central tube mounted inside the tube axially to form the direct flow pass, wherein a diameter of the central tube is less than the air output nozzle, wherein one end of the central tube extends into the air space and faces the air output nozzle; and multiple sheets mounted separately inside the tube, wherein the free ends of each sheets are set at opposite inner surfaces of the tube, with gaps between the free ends of the multiple sheets to form the indirect flow pass communicating with the air space, and wherein each sheet has a mounting hole for the central tube to pass through.

11. The air-pressure booster of claim 10, wherein the sealing cap has a filter mounted on the sealing cap.

12. The air-pressure booster of claim 3, wherein the front cap assembly is mounted near the tapered neck and has two holes, wherein the neighbor cap assembly has three holes, and further comprising a sealing cap mounted following after the neighbor cap assembly has one or more holes, wherein the sealing cap has an air inlet communicated with the air inlets of the cap assemblies, and multiple hooks formed on a wall of the sealing cap for engaging with the tube.

13. The air-pressure booster of claim 9, wherein the sealing cap has a filter formed on the sealing cap.

14. The air-pressure booster of claim 2, wherein the sealing cap has a filter formed on the sealing cap.

15. The air-pressure booster of claim 1, wherein the sealing cap has a filter formed on the sealing cap.

* * * * *